US012734959B2

(12) United States Patent
Ive et al.

(10) Patent No.: US 12,734,959 B2
(45) Date of Patent: Sep. 15, 2026

(54) ROAD VEHICLE PROVIDED WITH A MANUAL CONTROL FOR THE ACTIVATION OF THE HAZARD WARNING FLASHERS

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James McGrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Tommaso Carditello, Modena (IT)

(73) Assignee: FERRARI S.P.A., Modena (IT)

( * ) Notice: Subject to any disclaimer, the term of this patent is extended or adjusted under 35 U.S.C. 154(b) by 392 days.

(21) Appl. No.: 18/498,459

(22) Filed: Oct. 31, 2023

(65) Prior Publication Data

US 2024/0149780 A1 May 9, 2024

(30) Foreign Application Priority Data

Nov. 4, 2022 (IT) ........................ 102022000022737

(51) Int. Cl.
*B60Q 1/46* (2006.01)
*B60Q 1/26* (2006.01)
(Continued)

(52) U.S. Cl.
CPC .............. *B60Q 1/46* (2013.01); *B60Q 1/2611* (2013.01); *B60Q 3/57* (2017.02); *F21V 23/0492* (2013.01); *H01H 13/56* (2013.01)

(58) Field of Classification Search
CPC .......... B60Q 1/2611; B60Q 1/46; B60Q 3/54; B60Q 3/57; H01H 13/56; H01H 15/24; F21V 23/0492
See application file for complete search history.

(56) References Cited

U.S. PATENT DOCUMENTS

| | | | | |
|---|---|---|---|---|
| 2,841,031 A | | 7/1958 | Julius et al. | |
| 4,016,380 A | * | 4/1977 | Schawinsky | B60Q 1/343<br>200/61.54 |

(Continued)

FOREIGN PATENT DOCUMENTS

| | | |
|---|---|---|
| DE | 20005014 U1 | 5/2000 |
| DE | 102006049778 A1 | 4/2008 |

(Continued)

OTHER PUBLICATIONS

Machine translation of JP 2019-091575 to Hashimoto et al.; published Jun. 13, 2019. (Year: 2019).*

(Continued)

*Primary Examiner* — Daniel J Colilla
(74) *Attorney, Agent, or Firm* — CANTOR COLBURN LLP

(57) ABSTRACT

A road vehicle that has: a passenger compartment delimited by a roof at the top; at least one front seat arranged in the passenger compartment; and a manual control arranged on the roof for the activation of hazard warning flashers.

19 Claims, 4 Drawing Sheets

(51) Int. Cl.

| | |
|---|---|
| ***B60Q 3/57*** | (2017.01) |
| ***F21V 23/04*** | (2006.01) |
| ***H01H 13/56*** | (2006.01) |

(56) References Cited

U.S. PATENT DOCUMENTS

| | | | |
|---|---|---|---|
| 2015/0199041 | A1 | 7/2015 | Salter et al. |
| 2019/0070957 | A1 | 3/2019 | Nakatsuka et al. |
| 2022/0084760 | A1 | 3/2022 | Bruchschmidt et al. |

FOREIGN PATENT DOCUMENTS

| | | | | |
|---|---|---|---|---|
| EP | 1587117 | A1 * | 10/2005 | ............... B60Q 3/85 |
| JP | 2003137043 | A | 5/2003 | |
| JP | 2019091575 | A | 6/2019 | |
| JP | 2022097339 | A | 6/2022 | |
| WO | 03101779 | A2 | 12/2003 | |
| WO | 2022060322 | A1 | 3/2022 | |

OTHER PUBLICATIONS

European Search Report for European Patent Application No. 23205720.8, Date of Mailing: Apr. 11, 2024; 15 pages.

European Search Report for European Patent Application No. 23 205 720.8 dated Dec. 6, 2024.

Italian Search Report for Application No. 202200022737; Filing Date: Nov. 4, 2022; Date of Mailing: May 4, 2023; 11 pages.

Tesla: “Model 3 Owner’s Manual—software version 2020.12.5 Europe”, Apr. 2, 2020 (Apr. 2, 2020), pp. 1-271, XP093044557; 72 pages.

* cited by examiner 1
2
3
4
5
6
7
8
9
10
11
14

10
11
12
15
16

17
12
11
16
15
10

11
19
20
12
23
13
22
21
18
15
17
16
14

11
21
19
20
12
23
22
15
13
17
16
14

24
25
10
11
26

10
26
11
25
24

ROAD VEHICLE PROVIDED WITH A MANUAL CONTROL FOR THE ACTIVATION OF THE HAZARD WARNING FLASHERS

CROSS-REFERENCE TO RELATED APPLICATIONS

This patent application claims priority from Italian patent application no. 102022000022737 filed on Nov. 4, 2022, the entire disclosure of which is incorporated herein by reference.

TECHNICAL FIELD

This invention relates to a road vehicle provided with a manual control for the activation of the hazard warning flashers ("Hazard Warning Flasher Emulation"); the hazard warning flashers are commonly indicated with the expression "four-way flashers".

This invention finds advantageous application in a car provided with a manual control for the activation of the hazard warning flashers, to which the following discussion will make explicit reference without losing any generality thereby.

PRIOR ART

In a car, there must be a manual control for the activation of the hazard warning flashers: by operating (activating) this control, all the car's direction indicators are switched on intermittently so as to signal an abnormal situation (potential problems or hazards) that requires greater attention (for example, a car stopped in a dangerous position, a car strongly slowing down due to an obstacle, or a car that moves slowly forward due to a breakdown) to the other vehicles. Generally, the manual control for the activation of the hazard warning flashers consists of a button that is arranged on the dashboard or central tunnel between the two front seats (so the driver and front passenger can easily reach it), must be pressed, is identified by a triangle, is generally red so it is more visible, and, once pressed, lights up with a flashing light (which is also red).

In a modern car, the dashboard and the road tunnel generally have a lot of buttons and other types of controls and, thus, identifying the button that activates the hazard warning flashers may require too much time (particularly since when one needs to press the button, one is very agitated due to an emergency). Above all, identifying the button that activates the hazard warning flashers forces the driver to remove their attention from the road in front of the car to look at the dashboard and the tunnel, searching for the button that activates the hazard warning flashers.

The patent applications US2019070957A1 and US2015199041A1 describe a car wherein a manual control for the activation of the hazard warning flashers is arranged on the roof that delimits the passenger compartment at the top.

DESCRIPTION OF THE INVENTION

The purpose of this invention is to provide a road vehicle provided with a manual control for the activation of the hazard warning flashers that may be identified very quickly even in stressful situations and, above all, that may be identified without the driver's needing to remove their attention from the road in front of the car.

According to this invention, a road vehicle provided with a manual control for the activation of the hazard warning flashers is provided, according to what is claimed in the attached claims.

The claims describe preferred embodiments of this invention forming an integral part of this description.

BRIEF DESCRIPTION OF THE DRAWINGS

This invention will now be described with reference to the attached drawings that illustrate a non-limiting embodiment thereof, in which.

PREFERRED EMBODIMENTS OF THE INVENTION

Figure 1:
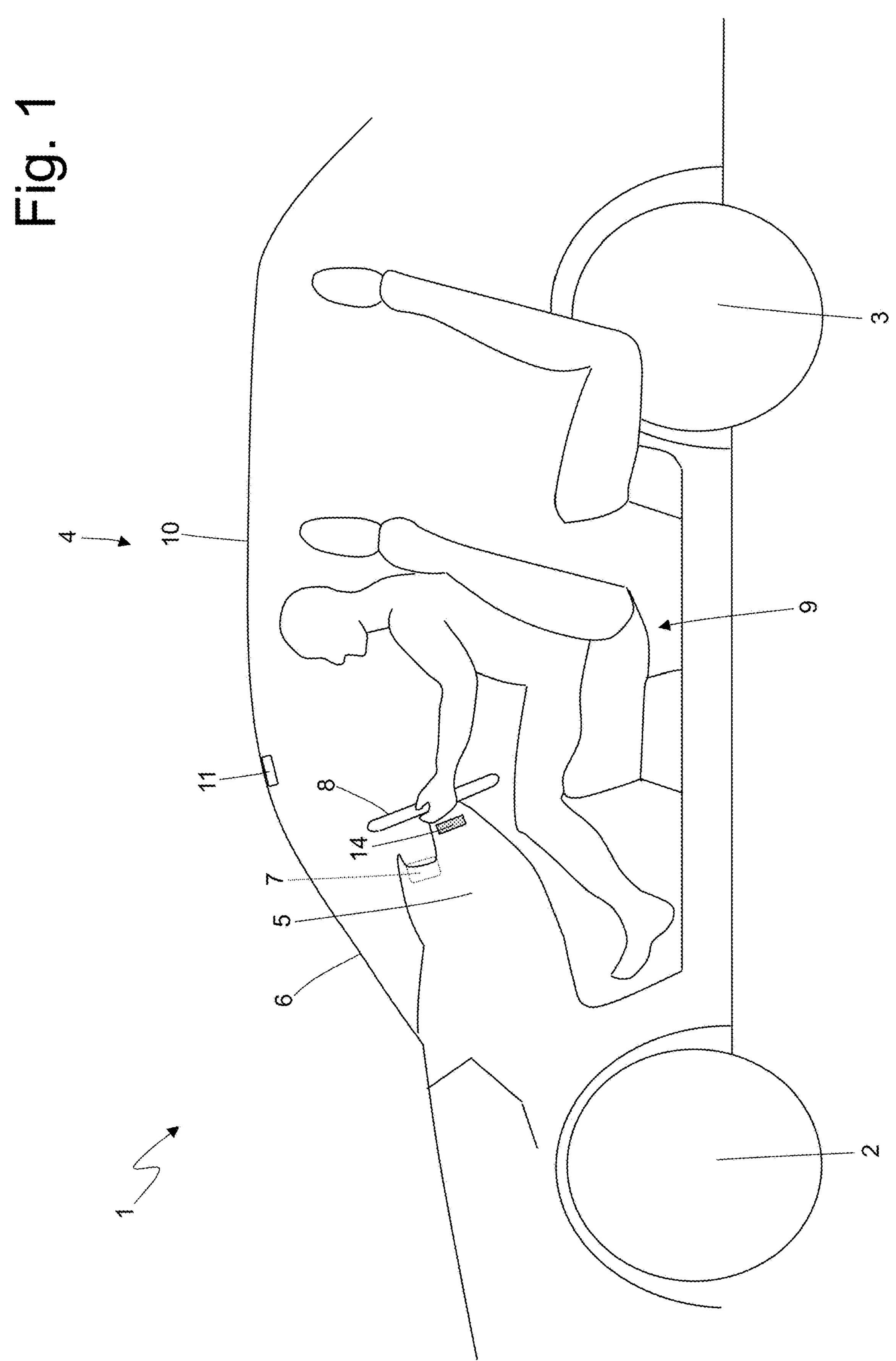
FIG. 1 is a schematic, side view of a road vehicle provided with a manual control for the activation of the hazard warning flashers produced in accordance with this invention.

In FIG. 1, reference numeral 1 globally denotes a road vehicle (in particular, a car) provided with two front driven and steered wheels 2 and two rear drive wheels 3, which receive the torque from a drivetrain system (alternatively, all four wheels 2 and 3 could be drive wheels or only the two front wheels 2 could be drive ones).

According to what is illustrated in FIG. 1, the road vehicle 1 comprises a passenger compartment 4 delimited at the front by a dashboard 5 that is arranged below a windshield 6. The dashboard 5 supports an instrument panel 7, which is arranged in front of the driver immediately behind the steering wheel 8. Inside the passenger compartment 4, two front seats 9 are arranged (only one of which can be seen in FIG. 1) that are located opposite the dashboard 5: one front seat 9 is for the driver and, thus, is located opposite the steering wheel 8 while the other front seat 9 is for a (possible) passenger. The passenger compartment 4 is delimited above by a roof 10 (more or less horizontal) that comprises the highest part of the road vehicle 1 (i.e. the part furthest from the road surface).

The road vehicle 1 comprises a manual control 11 for the activation of the hazard warning flashers: by operating (activating) this control, all the direction indicators of the road vehicle 1 are switched on intermittently so as to signal an abnormal situation (possible problems or hazards) that requires greater attention to the other vehicles.

The manual control 11 is arranged (mounted) on the roof 10 that delimits the passenger compartment 4 above, i.e. is located above the front seats 9 and, preferably, is arranged between the two front seats 9 (in the middle of the two front seats 9) so it can be operated by the driver or (possible) front passenger.

According to a preferred embodiment, the manual control 11 is configured to be activated by means of a vertical movement downwards; i.e. to activate ("switch on") the hazard warning flashers, you need to apply a vertical movement downwards to the manual control 11 (i.e. you need to pull the manual control 11 downwards).

Figures 4, 5:
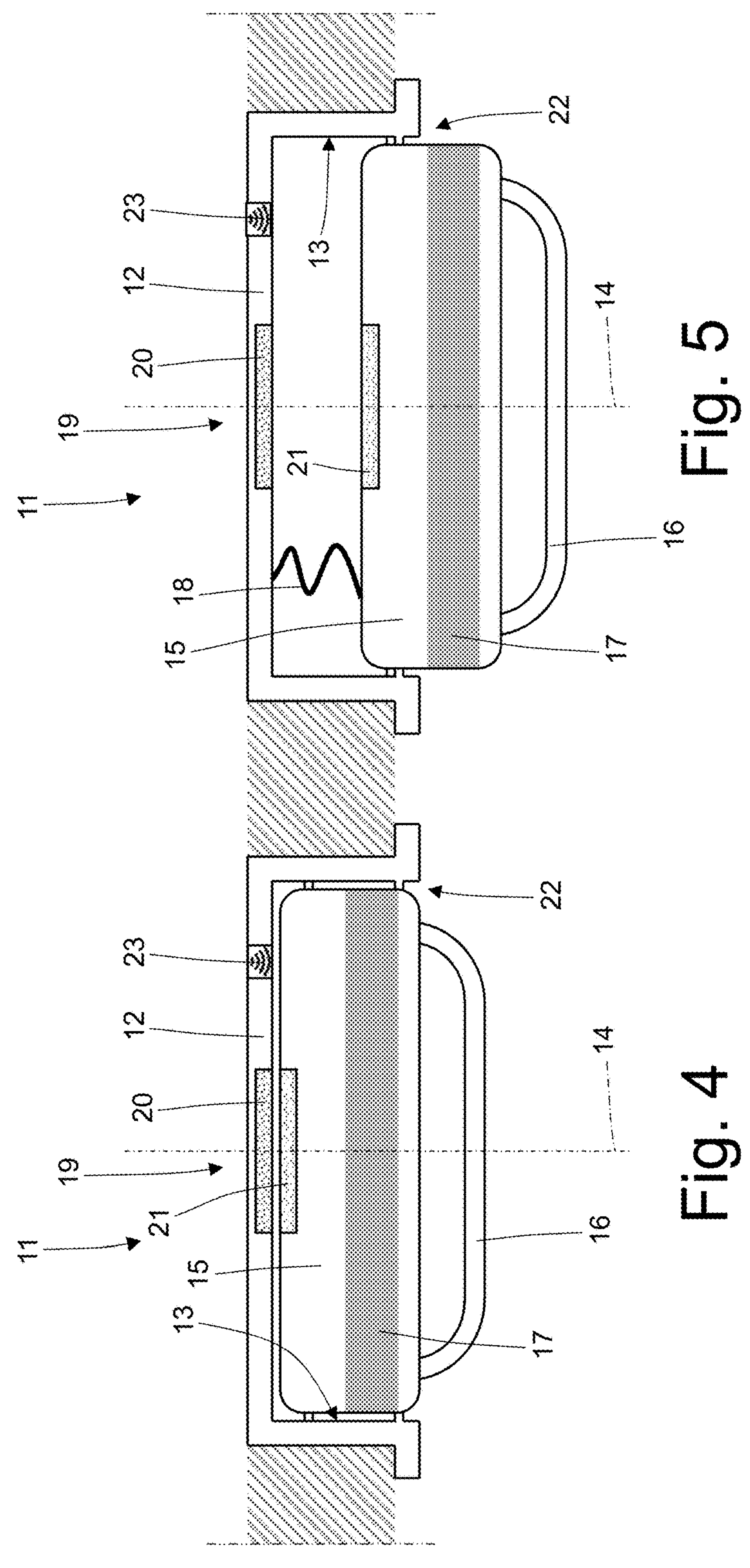
FIGS. 4 and 5 are two schematic, longitudinal cross-section views of the manual control for the activation of the hazard warning flashers in a deactivated and active position, respectively.

According to what is better illustrated in FIGS. 4 and 5, the manual control 11 comprises a support 12 that has a seat 13 that is parallelepiped-shaped and has a central axis 14 of symmetry oriented (approximately) vertically, i.e. perpendicularly to the roof 10 portion that is located around the manual control 11. In addition, the manual control 11 comprises a control body 15 that is parallelepiped-shaped, positively reproduces the shape of the seat 13 of the support 12, and is housed, so it can move, in the seat 13 to be shifted between a deactivated position (illustrated in FIGS. 2 and 4) wherein the hazard warning flashers are switched off and an active position (illustrated in FIGS. 3 and 5) wherein the hazard warning flashers are switched on.

As mentioned earlier, the control body 15 linearly translates (in particular axially, i.e. along the axis 14 of symmetry that is oriented vertically) between the deactivated position (illustrated in FIGS. 2 and 4) wherein the control body 15 is completely inserted in the seat 13 and the active position (illustrated in FIGS. 3 and 5) wherein the control body 15 is (at least) partially extracted from the seat 13.

Figures 2, 3:
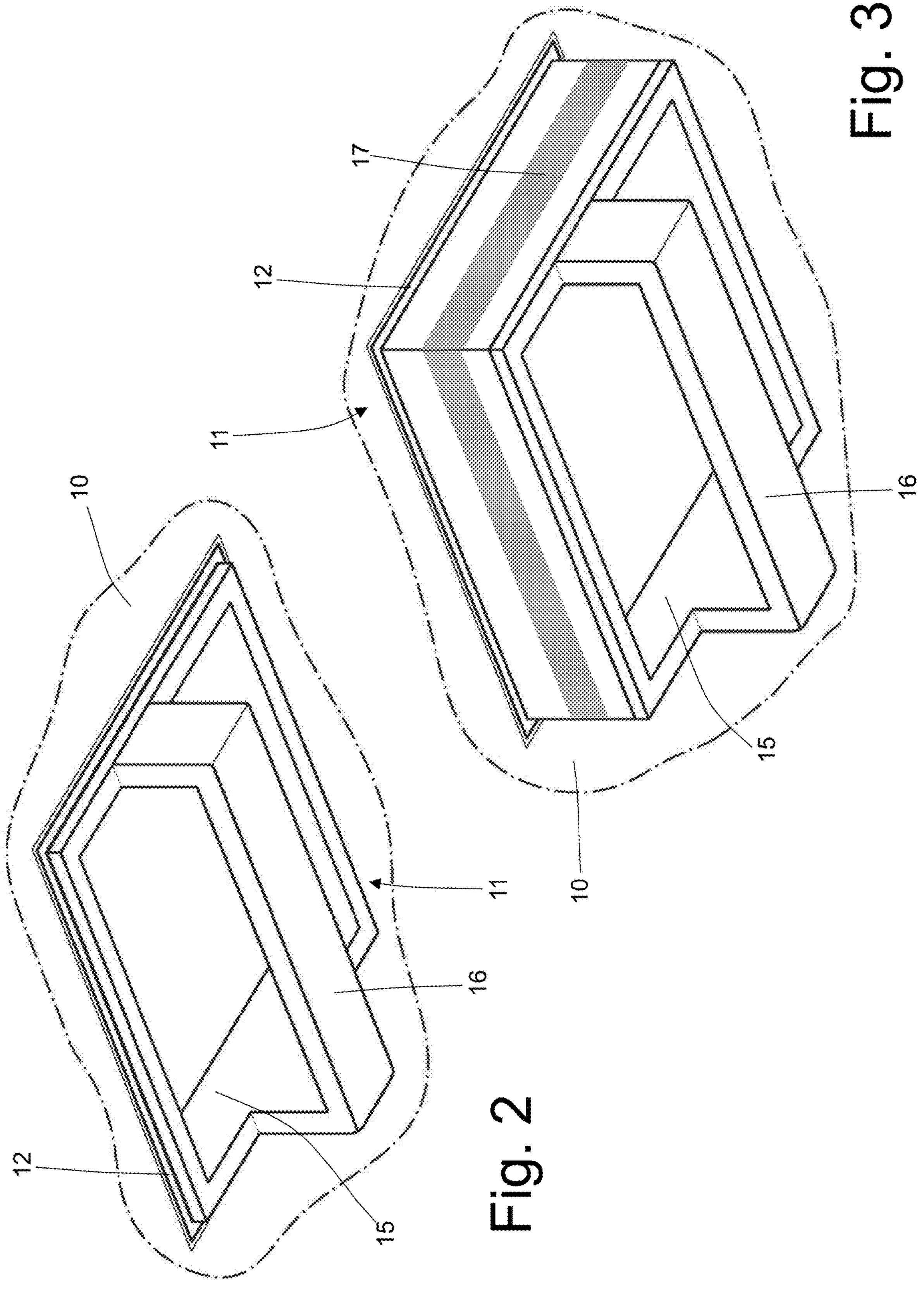
FIGS. 2 and 3 are two perspective views of the manual control for the activation of the hazard warning flashers, respectively, in a deactivated position and in an active position.

According to a preferred embodiment, the control body 15 comprises a handle 16 that can be grabbed and that projects downwards (i.e. towards the passenger compartment 4) and can be pulled to extract the control body 15 from the seat 13 and, thus, shift the control body 15 from the deactivated position (illustrated in FIGS. 2 and 4) to the active position (illustrated in FIGS. 3 and 5).

According to a preferred embodiment, the control body 15 comprises a light element 17, which is arranged in the area of a side wall of the control body 15 and is on the outside of the seat 13 only when the control body 15 is in the active position (illustrated in FIGS. 3 and 5) and is (at least) partially extracted from the seat 13. In other words, when the control body 15 is in the deactivated position (illustrated in FIGS. 2 and 4), the light element 17 is completely hidden inside the seat 13 (and is thus kept switched off), while the light element 17 becomes visible leaving the seat 13 only when the control body 15 is in the active position (illustrated in FIGS. 3 and 5) and is (at least) partially extracted from the seat 13. Obviously, the light element 17 is switched on to emit light (typically red) only when the control body 15 is in the active position (illustrated in FIGS. 3 and 5) and is (at least) partially extracted from the seat 13 and its function is to indicate that the hazard warning flashers are active.

According to a preferred embodiment, the light element 17 has an annular shape that completely surrounds (i.e. for 360°) the control body 15; since the control body 15 has a parallelepiped shape, the light element 17 also, obviously, has a parallelepiped shape.

According to a possible embodiment illustrated in FIG. 5, a spiral wire 18 is provided that connects the support 12 to a rear wall of the control body 15 to carry electricity to the light element 17 carried by the control body 15.

According to a preferred embodiment, the manual control 11 comprises a retaining system 19 that keeps the control body 15 in the deactivated position (illustrated in FIGS. 2 and 4) with a predetermined force. For example, the retaining system 19 could be magnetic and could comprise a permanent magnet 20 arranged in the support 12 and a corresponding permanent magnet 21 arranged in a rear wall of the control body 15 so that it faces the other permanent magnet 20 and is very near the permanent magnet 20 when the control body 15 is in the deactivated position (illustrated in FIGS. 2 and 4). The two permanent magnets 20 and 21 are arranged with inverted magnetic polarities to attract each other. Obviously, one of the two permanent magnets 20 and 21 could be replaced by a simple piece of ferromagnetic metal. Alternatively, the retaining system 19 could be mechanical and, thus, comprise, for example, a reversible quick release clip.

According to a preferred embodiment, the manual control 11 comprises a limit stop 22, which limits the maximum extraction of the control body 15 from the seat 13 when the control body 15 is in the active position (illustrated in FIGS. 3 and 5). For example, the limit stop 22 could comprise circumferential ribbing that projects outside the control body 15 and a similar circumferential ribbing that projects from the seat 13 inside to hit the circumferential ribbing of the control body 15 when the control body 15 reaches the maximum possible extraction from the seat 13.

According to a preferred embodiment, the manual control 11 comprises a sensor 23 (for example, a proximity sensor) that detects the position of the control body 15 inside the seat 13 and, thus, is able to determine whether the control body 15 is, or is not, in the deactivated position (illustrated in FIGS. 2 and 4). When the control body 15 is not in the deactivated position (illustrated in FIGS. 2 and 4), it is assumed that the control body 15 must be in active position (illustrated in FIGS. 3 and 5).

As mentioned above, the seat 13 and the control body 15 both have a parallelepiped shape. According to a different embodiment not illustrated, the seat 13 and the control body 15 both have a cylindrical shape. In this case, the control body 15 can rotate inside the seat 13 and around the axis 14 of symmetry while, according to an alternative embodiment, there are mechanical blocks (for example, ribbing of the seat 13 that is axially oriented and engages a slit in the control body 15) that impede the rotation of the control body 15 inside the seat 13 and around the axis 14 of symmetry.

According to a preferred embodiment, the manual control 11 is collapsible, with a calibrated and relatively reduced collapse resistance, so that, in the event of any impact against the head of the passenger as a result of a frontal collision, the manual control 11 collapses without posing an (excessive) danger to the user's head. In other words, in the event of an impact, the control body 15 (that is the "projecting" element of the manual control 11) can completely re-enter the seat 13 with little effort. To this end, according to a preferred embodiment, the manual control 11 only has rounded parts without any sharp edges externally.

According to other embodiments not illustrated, the seat 13 and the control body 15 could have shapes other than the parallelepiped and cylindrical shape.

Figure 7:
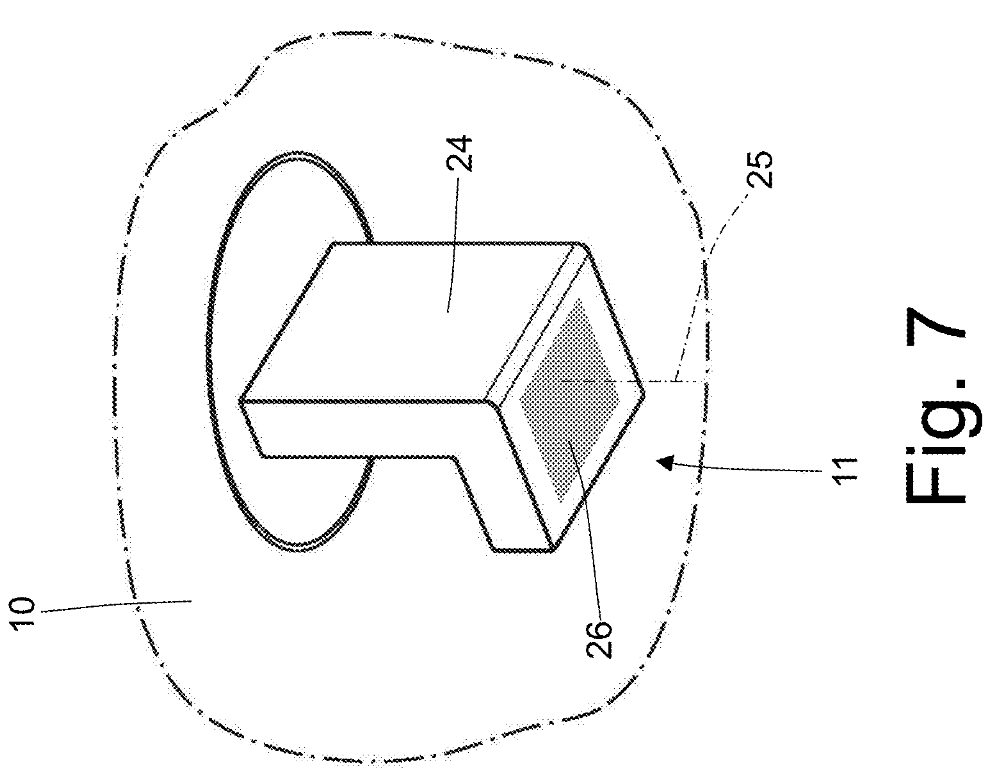
FIGS. 6 and 7 are two perspective views of additional embodiments of the manual control for the activation of the hazard warning flashers.
Figure 6:
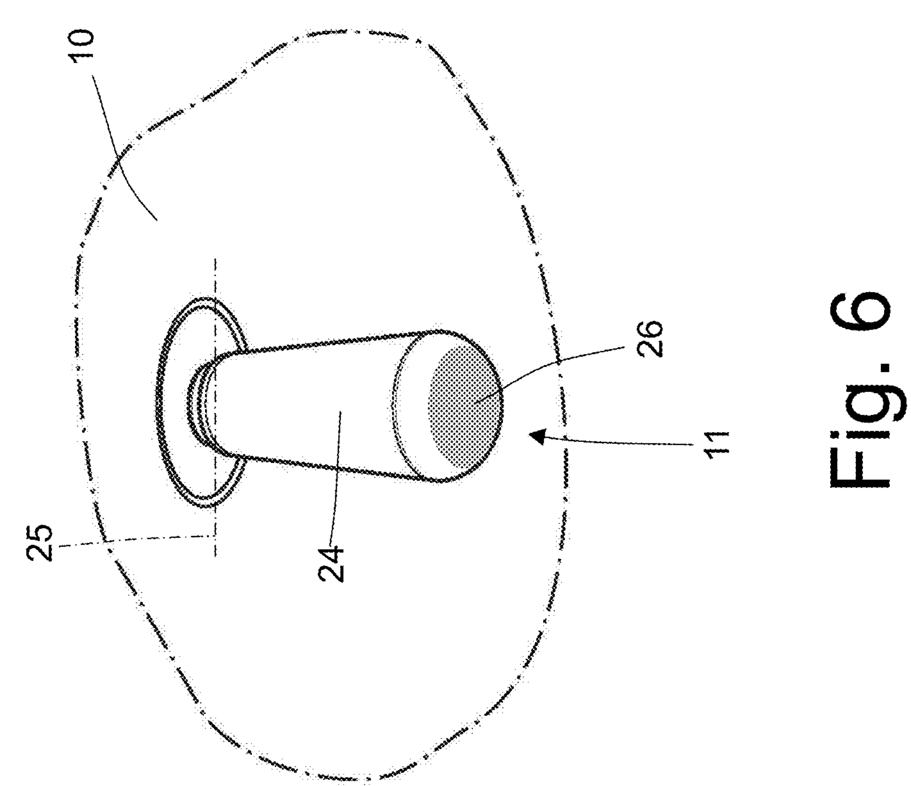

In the alternative embodiment illustrated in FIGS. 6 and 7, the manual control 11 comprises a lever 24 that is hinged to rotate around a rotation axis 25 between the deactivated position wherein the hazard warning flashers are switched off and the active position wherein the hazard warning flashers are switched on. In the embodiment illustrated in FIG. 6, the rotation axis is horizontal (i.e. parallel to the plane defined by the roof 10 of the passenger compartment 4), while, in the embodiment illustrated in FIG. 7, the rotation axis is vertical (i.e. perpendicular to the plane defined by the roof 10 of the passenger compartment 4).

From the above, it is clear that the support 12 is configured to be preferably mounted (more or less) horizontally on the roof 10 of the passenger compartment 4 so that the control body 15 translates linearly between the deactivated position and the active position by means of a (more or less) vertical movement downwards.

According to a different embodiment not illustrated, the manual control 11 for the activation of the hazard warning flashers produced as in the attached figures could be mounted on the dashboard or on the tunnel instead of on the roof 10 of the passenger compartment 4.

According to a different embodiment, the manual control 11 described above is not used for the activation of hazard warning flashers but is used to activate or deactivate other functions of the road vehicle 1 (for example activate or deactivate a particular configuration of the road vehicle 1 adapted to performance driving on the track).

The embodiments described herein may be combined between them without departing from the scope of protection of this invention.

The manual control 11 for the activation of the hazard warning flashers that is described above has numerous advantages.

In the first place, the manual control 11 described above can be identified very quickly, even in stressful situations and especially without the driver having to remove their attention from the road in front of the road vehicle 1. In fact, the driver (a similar operation can be performed by the front passenger) must simply raise their right hand, feeling (i.e. touching the roof 10) for the manual control 11 while always keeping their eyes on the road in front of the road vehicle 1. On the roof 10, there is only the manual control 11 (all around the manual control 11, the roof 10 is perfectly smooth), so that, even feeling for it, the driver identifies the position of the manual control 11 with their right hand in very few seconds.

In addition, the manual control 11 described above has a very intuitive implementation since once the right hand of the driver has found the handle 16 of the manual control 11, they only have to pull the handle 16 of the manual control 11 downwards.

Among other things, the positioning of the manual control 11 on the roof 10 between the two front seats 9 allows easy actuation of the manual control 11, not just for a (possible) front passenger but also for (possible) rear passengers.

Finally, the manual control 11 described above is simple and economical to produce, since it uses components that can be found on the market.

REFERENCE NUMBER LIST FOR FIGURES

1 vehicle
2 front wheels
3 rear wheels
4 passenger compartment
5 dashboard
6 windshield
7 instrument panel
8 steering wheel
9 front seats
10 roof
11 manual control
12 support
13 seat
14 axis of symmetry
15 control body
16 handle
17 light element
18 wire
19 retaining system
20 permanent magnet
21 permanent magnet
22 limit stop

The invention claimed is:

1. A road vehicle (1) comprising:
- a passenger compartment (4) delimited by a roof (10) at the top;
- at least one front seat (9) arranged in the passenger compartment (4); and
- a manual control (11) for the activation of hazard warning flashers that is arranged on the roof (10) and is configured to be activated by means of a vertical movement from the top to the bottom;
- wherein the manual control (11) comprises a support (12) having a seat (13) and a control body (15), which is accommodated in the seat (13) in a movable manner to be moved between a deactivated position, in which the hazard warning flashers are off, and an active position, in which the hazard warning flashers are on;
- wherein the control body (15) comprises a light element (17), which is arranged in the area of a side wall of the control body (15) and is on the outside of the seat (13) only when the control body (15) is in the active position and is at least partially extracted from the seat (13).

2. The road vehicle (1) according to claim 1, wherein in the passenger compartment there are two front seats (9) and the manual control (11) is arranged between the two front seats (9).

3. The road vehicle (1) according to claim 1, wherein the control body (15) linearly translates between the deactivated position and the active position, in which the control body (15) is at least partially extracted from the seat (13).

4. The road vehicle (1) according to claim 1, wherein, in the deactivated position, the control body (15) is completely inserted in the seat (13).

5. The road vehicle (1) according to claim 1, wherein the control body (15) comprises a handle (16), which can be grabbed and can be pulled to extract the control body (15) from the seat (13), thus moving the control body (15) from the deactivated position to the active position.

6. The road vehicle (1) according to claim 1, wherein the light element (17) has an annular shape completely surrounding the control body (15).

7. The road vehicle (1) according to claim 1, wherein the control body (15) has a cylindrical shape.

8. The road vehicle (1) according to claim 1, wherein the manual control (11) comprises a retaining system (19), which holds the control body (15) in the deactivated position with a predetermined force.

9. The road vehicle (1) according to claim 1, wherein the manual control (11) comprises a limit stop (22), which limits the maximum extraction of the control body (15) from the seat (13) when the control body (15) is in the active position.

10. The road vehicle (1) according to claim 1, wherein the support (12) of the manual control (11) is configured to be mounted horizontally, so that the control body (15) linearly translates between the deactivated position and the active position by means of a vertical movement from the top to the bottom.

11. The road vehicle (1) according to claim 1, wherein the manual control (11) is collapsible, thus allowing the control body (15) to completely get into the seat (13).

12. A manual control (11) for the activation of hazard warning flashers in a road vehicle (1); the manual control (11) comprises a support (12) having a seat (13) and a control body (15), which is accommodated in the seat (13) in a movable manner so as to be moved between a deactivated position, in which the hazard warning flashers are off, and an active position, in which the hazard warning flashers are on;

wherein the control body (15) linearly translates between the deactivated position and the active position, in which the control body (15) is at least partially extracted from the seat (13);

wherein the control body (15) comprises a light element (17), which is arranged in the area of a side wall of the control body (15) and is on the outside of the seat (13) only when the control body (15) is in the active position and is at least partially extracted from the seat (13);

wherein the control body (15) has a cylindrical shape and the light element (17) has an annular shape.

13. The manual control (11) according to claim 12, wherein, in the deactivated position, the control body (15) is completely inserted in the seat (13).

14. The manual control (11) according to claim 12, wherein the control body (15) comprises a handle (16), which can be grabbed and can be pulled in order to extract the control body (15) from the seat (13), thus moving the control body (15) from the deactivated position to the active position.

15. The manual control (11) according to claim 12, wherein the control body (15) has a cylindrical shape.

16. The manual control (11) according to claim 12 and comprising a retaining system (19), which holds the control body (15) in the deactivated position with a predetermined force.

17. The manual control (11) according to claim 12 and comprising a limit stop (22), which limits the maximum extraction of the control body (15) from the seat (13) when the control body (15) is in the active position.

18. The manual control (11) according to claim 12, wherein the support (12) is configured to be mounted horizontally, so that the control body (15) linearly translates between the deactivated position and the active position by means of a vertical movement from the top to the bottom.

19. The road vehicle (1) according to claim 12, wherein the manual control (11) is collapsible, thus allowing the control body (15) to completely get into the seat (13).

* * * * *